(12) United States Patent
Jackson et al.

(10) Patent No.: US 10,609,037 B2
(45) Date of Patent: Mar. 31, 2020

(54) CONSOLIDATED MULTI-FACTOR RISK ANALYSIS

(71) Applicant: CA, Inc., Islandia, NY (US)

(72) Inventors: Jerry Jackson, Islandia, NY (US); Charley Chell, Islandia, NY (US); Jeff Frantz, Islandia, NY (US)

(73) Assignee: CA, Inc., New York, NY (US)

( * ) Notice: Subject to any disclaimer, the term of this patent is extended or adjusted under 35 U.S.C. 154(b) by 163 days.

(21) Appl. No.: 15/471,714

(22) Filed: Mar. 28, 2017

(65) Prior Publication Data
US 2018/0288060 A1 Oct. 4, 2018

(51) Int. Cl.
*G06F 21/31* (2013.01)
*H04L 29/06* (2006.01)
*H04W 12/00* (2009.01)

(52) U.S. Cl.
CPC ............ *H04L 63/102* (2013.01); *H04L 63/08* (2013.01); *H04L 63/0853* (2013.01); *H04L 63/107* (2013.01); *H04L 63/1408* (2013.01); *H04L 2463/082* (2013.01); *H04W 12/00503* (2019.01)

(58) Field of Classification Search
CPC .......... G06F 21/31; G06F 21/50; G06F 21/57; H04L 63/102
See application file for complete search history.

(56) References Cited

U.S. PATENT DOCUMENTS

| | | | |
|---|---|---|---|
| 8,832,790 B1* | 9/2014 | Villa | H04L 63/123 726/2 |
| 2002/0120866 A1* | 8/2002 | Mitchell | G06F 21/31 726/4 |
| 2003/0014658 A1* | 1/2003 | Walker | G06F 21/57 726/22 |
| 2007/0192608 A1* | 8/2007 | De Arruda Villela | G06F 21/31 713/176 |
| 2010/0107225 A1* | 4/2010 | Spencer | H04L 63/0876 726/4 |
| 2010/0229224 A1* | 9/2010 | Etchegoyen | G06F 21/31 726/5 |
| 2011/0302630 A1* | 12/2011 | Nair | G06F 21/41 726/4 |
| 2012/0131652 A1* | 5/2012 | Anand | H04L 63/08 726/6 |
| 2014/0173686 A1* | 6/2014 | Kgil | H04L 63/205 726/1 |
| 2017/0374076 A1* | 12/2017 | Pierson | H04L 63/0236 |

* cited by examiner

*Primary Examiner* — Ponnoreay Pich
(74) *Attorney, Agent, or Firm* — Shook, Hardy & Bacon L.L.P.

(57) ABSTRACT

Provided is a process of authenticating a user, the process including: receiving an authentication request sent by a first computing device; receiving an observed profile of the second computing device; accessing a known profile of the second computing device; determining that the known profile corresponds to the observed profile; sending an authentication credential to either the second computing device or the first computing device; receiving the authentication credential from either the first computing device or the second computing device; and in response to receiving the authentication credential and the determination that the known profile corresponds to the observed profile, determining that the user is authenticated.

20 Claims, 3 Drawing Sheets

CONSOLIDATED MULTI-FACTOR RISK ANALYSIS

BACKGROUND

1. Field

The present disclosure relates generally to computer security and, more specifically, to multi-factor authentication.

2. Description of the Related Art

Recently, many software applications have migrated to the cloud. Often, user-facing and back-end software applications execute on remote computer systems hosted by various third parties. Examples include productivity suites, calendaring applications, email, document management platforms, enterprise resource planning applications, project management applications, and various databases. When attempting to use these applications, before being granted access, users are often authenticated by the computer system to determine that the person seeking access is authorized to do so.

Two-factor authentication (2fa) is often used to authenticate users during sign-on. Examples include using a user's ability to prove they possess their mobile device to authenticate a session on a different device, like their laptop. In this example, the first factor is often their password being entered into the laptop, and the second factor is often the user supplying a code to the laptop that was texted to their phone. Another example includes asking the user to enter an input on the mobile device responsive to a message sent to an authentication application on the mobile device. In each case, the user provides some input indicative of their access to the mobile device associated with an account they are attempting to access on the laptop. Thus, cross-device authentication often provides an added signal, beyond the user's password, that the user is who the users represents themselves to be.

SUMMARY

The following is a non-exhaustive listing of some aspects of the present techniques. These and other aspects are described in the following disclosure.

Some aspects include a process of authenticating a user, the process including: receiving, with one or more processors, via a network, an authentication request sent by a first computing device associated with a user to be authenticated; determining, with one or more processors, a second computing device, different from the first computing device, associated with the user based on a record created before receiving the authentication request; sending, with one or more processors, via a network, instructions to the second computing device that cause the second computing to effectuate operations comprising: forming with the second computing device, or accessing in storage of the second computing device, an observed profile of the second computing device, wherein the observed profile is based on attributes of the second computing device, the attributes including: attributes of physical hardware of the second computing device, attributes of software installed on the second computing device, attributes of firmware installed on the second computing device, or usage attributes of the second computing device, and sending, via a network, the observed profile in response to receiving the instructions receiving, with one or more processors, via a network, the observed profile; accessing, with one or more processors, a known profile of the second computing device formed, at least in part, before receiving the authentication request, wherein the known profile is based on the attributes of the second computing device; determining, with one or more processors, that the known profile corresponds to the observed profile based on correspondence between known and observed attributes of the second computing device; sending, with one or more processors, an authentication credential to either the second computing device or the first computing device; after sending the authentication credential, receiving, with one or more processors, the authentication credential from either the first computing device or the second computing device, wherein the authentication credential is received from a different computing device from the computing device to which the authentication credential was sent; in response to receiving the authentication credential from the first computing device and the determination that the known profile corresponds to the observed profile, determining, with one or more processors, that the user is authenticated; and sending, with one or more processors, via a network, a message indicating that the user is authenticated or granting access to resources in response to determining that the user is authenticated.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
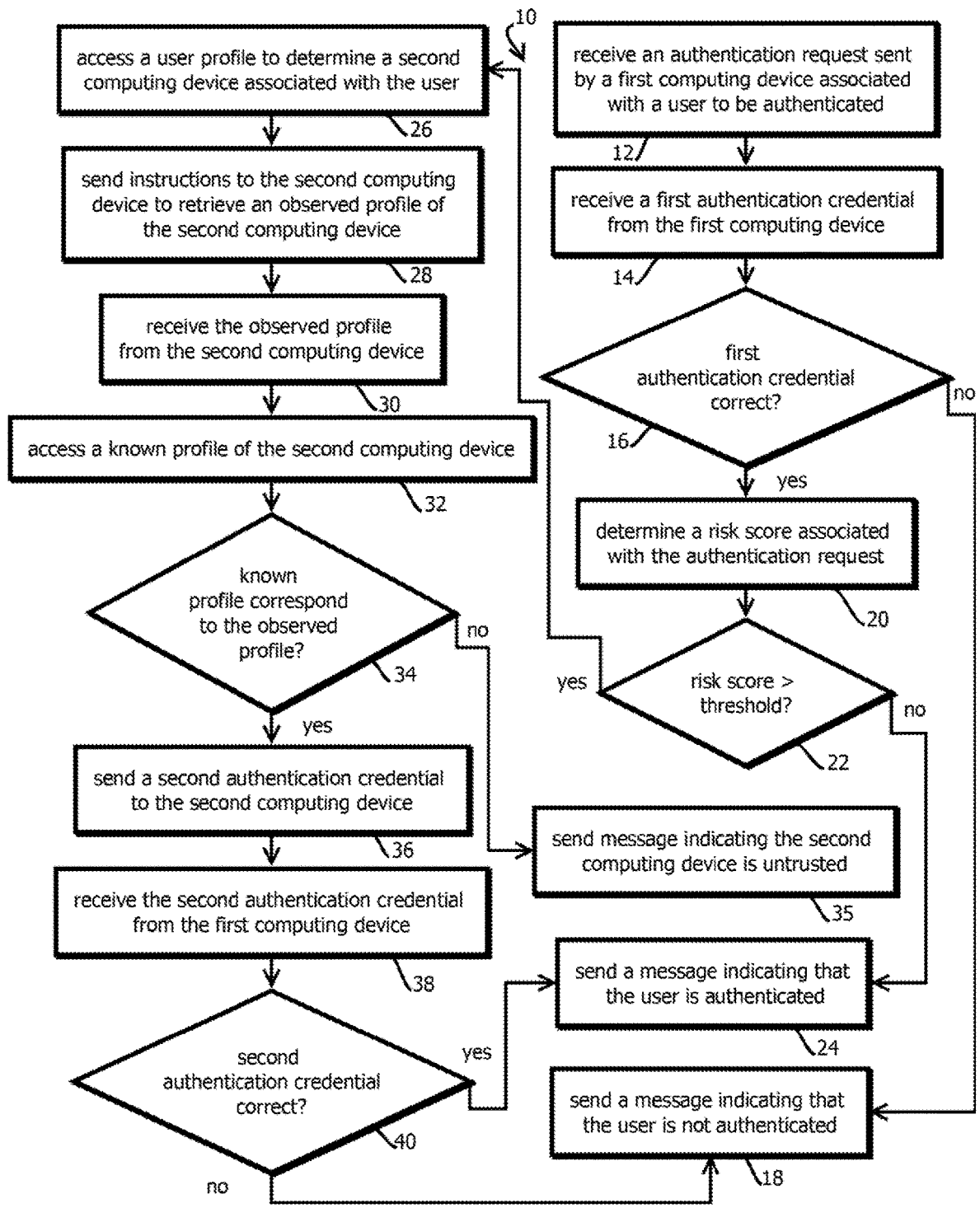
FIG. 1 is a flowchart illustrating an example of a process for two-factor authentication in accordance with some embodiments.

While the disclosed techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the disclosed techniques to the particular form disclosed, but to the contrary, the intention is to cover all modifications, equivalents, and alternatives falling within the spirit and scope of the present disclosed techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of computer security. Indeed, the inventors wish to emphasize the difficulty of recognizing those problems that are nascent and will become much more apparent in the future should trends in the distributed workload platform field continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

One attack vector for some forms of 2fa is mobile device emulation. Examples include a man-in-the-middle attack, where an attacker accesses a network node between a legitimate user and the remote application and intercepts communications (e.g., a code to be entered on a mobile device). Other examples include re-routing signals sent to the mobile device's network address (e.g., phone number or IP address) to some other device in the possession of an attacker. An attacker could potentially use intercepted or rerouted communications to gain access, e.g., by impersonating the mobile device on the network to make it appear as if the attacker is in possession of the mobile device.

To mitigate these risks (or address other issues discussed below and apparent from the description), some embodiments use a "fingerprint" of the mobile device (or other computing device used as a second factor) to confirm that another computing device has not been substituted in an attack. Prior to authentication, some embodiments gather data about software, hardware, and usage attributes of the mobile device. At authentication time, some embodiments compare those attributes to a known fingerprint of the device to confirm that the mobile device being used for 2fa is the intended device. Based a result of the comparison, e.g., a strength of a match and other signals indicative or risk, various actions may be taken:

The mobile device may be determined trustworthy or untrustworthy for 2fa;

An updated fingerprint of the mobile device may be formed;

The mobile device may be determined trustworthy for 2fa for access to some, but not all, resources; or A third factor may be requested if the mobile device has an elevated risk score.

In some embodiments, these techniques and variations thereon may be implemented by a process 10 illustrated in FIG. 1. In some embodiments, the process 10 is executed in a computing environment described below with reference to FIG. 2, for instance, implemented with the computers described below with reference to FIG. 3. In some embodiments, instructions for implementing the functionality described herein may be stored on a tangible, non-transitory, machine-readable medium, such that when those instructions are executed by one or more processors, the described functionality is implemented. In some cases, notwithstanding use of the singular term "medium," the instructions may be distributed on different storage devices associated with different computing devices, for instance, with each computing device having a different subset of the instructions, an implementation consistent with usage of the singular term "medium" herein.

In some embodiments, multiple instances of the process 10 may be executed concurrently, for example, to service a relatively large number of concurrent authentication sessions. Commercial embodiments are expected to include relatively large user bases, for example, exceeding 100,000 or 10 million users, in some cases, servicing more than 1000 authentication sessions concurrently at peak usage.

In some embodiments, the process 10 begins with receiving an authentication request sent by a first computing device associated with the user to be authenticated, as indicated by block 12. In some cases, the request may be received after the user navigates a web browser to attempt to access various online resources or after the user attempts to access various resources over a network with a special purpose application, such as a native mobile application executing on the first computing device. In some embodiments, the request is a request to access the resources with the first computing device. In some embodiments, the request is received with a user identifier, for instance, one that uniquely identifies the user among users of an authentication system. In some embodiments, the user identifier is obtained by responding to the request by sending an authentication user interface having instructions that retrieve from persistent memory of the computing device (for instance, in a browser cookie, localStorage object, or SQLite database) a user identifier previously stored, or a user identifier entered by the user, for instance, in a text box input sent in the authentication user interface and returned by the user computing device.

In some embodiments, an authentication user interface presented by the first computing device may also include a text box input or other type of input for the first user to enter a first authentication credential. In some embodiments, that authentication credential may be sent by, and received from, the first computing device, as indicated by block 14. The first authentication credential may take a variety of different forms, including a text password, a biometric measurement, a code entered from an electronic dongle, such as one implementing a linear shift register that outputs pseudorandom values, a code read from a memory device attached to the first computing device by the user, such as a universal serial bus (USB) device having an authentication code stored thereon, or the like.

Next, some embodiments may determine whether the first authentication credential is correct, as indicated by block 16. In some cases, based on the received user identifier, a corresponding authentication record may be retrieved from a database, and a stored authentication credential may be compared to the received authentication credential. For instance, some embodiments may determine whether the two match, thereby indicating that the received first authentication credential is correct. In some cases, the authentication credentials may be protected from a breach both at rest and in transit with encryption. For example, in these two instances, stored and in transit, authentication credentials may be salted by appending a random string to the authentication credential, for instance, by appending a number of characters needed to attain a designated string size, making shorter and longer authentication credentials appear to have the same length after salting. Further, some embodiments may then encrypt the salted strings for transmission or storage. Later, the values may be decrypted, the salt string removed, and the result compared in the determination of block 16.

Upon determining that the first authentication credential is not correct, some embodiments may send a message indicating that the user is not authenticated, as indicated by block 18. In some cases, the message may be sent to the first computing device. In some cases, the message may be sent to other computing devices, such as one of the third-party software-as-a-service (SaaS) application servers described below with reference to FIG. 2. In some embodiments, a record in a user profile may include a value indicating an amount of failed authentication attempts, for instance, a log, and some embodiments may determine whether more than a threshold amount of failed authentication attempts have occurred within a threshold duration of trailing time before performing the determination of block 16, e.g., to rate limit authentication attempts and defeat or impair brute force attacks. In some cases, failed authentication attempts may also be associated with a network address or other attributes of the first computing device, regardless of the user identifier for which authentication is sought, and some embodiments may also block authentication attempts in which sufficiently similar, for example, having the same network address, computing devices have submitted authentication attempts exceeding a threshold amount in a threshold duration of time, like more than 10 in one second to detect scripted authentication brute force attacks, and more than 10 in one hour where human submissions are also of concern.

Next, in an alternate branch from block 16, some embodiments may determine a risk score associated with the authentication request, as indicated by block 20. In some cases, the risk score may be determined based on a stored profile associated with the user identifier. In some embodiments, the profile may indicate attributes of previous sessions with the user, or the lack thereof. In some cases, the risk score is based on a variety of attributes of the previous sessions, for example, a number of previous sessions within a threshold duration of time, geolocations of the user in previous sessions, Internet Protocol addresses of the user in previous sessions, whether the first computing device corresponds to previous computing devices used by the user in previous sessions as indicated by techniques like those described below with reference to a second computing device, and the like. In some cases, the risk score may be based on similarities between attributes of a current session and attributes of previous sessions, such as geographic distances between a geolocation associated with the current session (e.g., indicated by an Internet Protocol address used by the first computing device or a geolocation sensor of the first computing device), with greater distances indicating higher risk scores. In some cases, the comparison may be between a centroid of previous geolocations, a centroid of a cluster of previous geolocations, for instance, determined with a clustering algorithm, like DBSCAN, in some cases using a cluster having a closest centroid or closest perimeter determined with a convex hull algorithm to a current geolocation of the user.

In some cases, the risk score is determined based on a weighted combination, for example, a weighted sum, of differences or similarities between attributes of previous sessions and the current session. In some cases, these weights may be adjusted, for instance, through manual tuning, based on feedback indicative of previous false positives or false negatives in authentication determinations, or by training a machine learning model with a supervised machine learning training algorithm, like a gradient descent algorithm, based on a training set including previous sessions with false positives and false negatives and correct determinations. Some embodiments may train an anomaly detection model based on attributes of previous sessions with the user, for instance, in a batch process before receiving the authentication request, and then apply the trained model to attributes of a current authentication request to classify the current authentication request as anomalous or consistent with previous usage. In some cases, training the model may include determining whether sufficient data exists with sufficient consistency to provide reliable classifications, and some embodiments may default to a relatively high risk score in response to determining that sufficient information is not available.

Next, some embodiments may determine whether the risk score exceeds a threshold, as indicated by block 22. Or some embodiments may implement a risk score where lower values indicate greater risk, and those embodiments may determine whether the risk score is less than a threshold. These scenarios may be referred to generally as determining whether the risk score satisfies the threshold. In some embodiments, the threshold may be adjusted dynamically, for instance, with the same techniques described above for adjusting the weights or models by which the scores are determined.

Upon determining that the risk score is not greater than the threshold, some embodiments may send a message indicating that the user is authenticated, as indicated by block 24. Thus, some embodiments may permit single factor authentication in scenarios deemed to be relatively low risk, thereby providing a relatively user-friendly authentication experience while mitigating risks. That said, not all embodiments afford these benefits, for instance, some embodiments may apply two-or-higher factor authentication to all authentication sessions, which is not to suggest that any other feature described herein is not also amenable to variation in some embodiments.

In some embodiments, the message indicating that the user is authenticated may be sent to the first computing device or one of the third-party SaaS application servers described below. In some embodiments, the message may be a computer-readable message (e.g., in the form of computer instructions or structured data) sent to one of the third-party SaaS applications via the first computing device. For example, a uniform resource identifier (URI) associated with the third-party SaaS application for which authentication is sought may be retrieved from memory, an access token may be generated based on a cryptographic key associated with the third-party SaaS application of the account, and the access token may be appended as a parameter to the URI, which may be sent to the first computing device as a redirect instruction. The redirect instruction may cause the receiving first computing device to attempt to retrieve resources from the URI with the request including the access token, and the corresponding third-party SaaS application server may receive the URI, parse the access token, and determine that the access token is valid, for instance, based on a public key of the system authenticating the user corresponding to a private key used by that system to generate the access token. In response, the third-party SaaS application server may grant access to the first computing device. Similar techniques may be implemented with on premises applications.

In an alternative branch of block 22, some embodiments may determine that the current authentication session is relatively high risk and proceed to implement steps to secure a second factor for authenticating the user. In some cases, the second factor may include demonstrating that the user is in possession of another, different computing device associated with the user in the user's profile. For example, the user's cell phone, wearable computing device, in-dash automotive computing device, set-top box, tablet computer, laptop computer, Internet-of-things appliance, or the like may serve as the second computing device. In these examples, the second computing device is a different computing device from the first computing device. In some cases, the user may register the second computing device with an authentication subsystem of an identity management system in advance of sending the request by the first computing device to authenticate the user, for example during a registration process. In some cases, registration may occur more than an hour, day, or month in advance of requesting authentication.

Accordingly, some embodiments may access a user profile to determine a second computing device associated with the user, as indicated by block 26. In some embodiments, the user may be associated with a plurality of different computing devices other than the first computing device. In some embodiments, the user profile may specify which of these other computing devices is to serve as the second computing device for two-factor authentication, and that computing device may be selected based on these records. In other cases, the second computing device may be selected based on attributes of the other computing devices, for example, the second computing device may be selected based on that computing device being a mobile computing device, for instance, a cell phone, expected to be with the user. In some cases, the second computing device may be selected from among the plurality of other computing devices based on rates of usage, for instance, the most commonly used other computing device of the user may be selected based on records of previous sessions in the user profile.

In some embodiments, determining the second computing device includes determining a network address of the second computing device, such as a telephone number, Internet Protocol address, or the like. In some cases, the network address is one amenable to push communications, such as a telephone number that is consistent over time, rather than an Internet Protocol address that may change each time the user connects. Or in some embodiments, an application executing on the user's computing device may periodically transmit a message back to a central server, such as an identity management system, indicating a current Internet Protocol address at which the second computing device is reachable, and that address may be stored and retrieved in block 26 based on a stored association with the second computing device. Or in some embodiments, the second computing device may register its IP address for push notifications with a third party server, and the association may be maintained there and queried from that server (or encrypted messages may be routed through that service).

Push communications, such as those based on telephone number network addresses, are expected to be more secure than pull communications in some use cases. Often, it is easier for an attacker to spoof a pull communication and impersonate the second computing device, for instance, by sending an application program interface (API) request for information or an API transmission with a device profile as described below. In contrast, is often more difficult for an attacker to intercept a push communication to a persistent address, such as a telephone number, like via a short-message service (SMS) message. That said, not all embodiments use push communications. For example, some embodiments may store a private encryption key on the second computing device during registration, and the second computing device may be configured to respond to a communication with proof of possession of that private encryption key, thereby also mitigating man in the middle attacks.

Some embodiments may then send instructions to the second computing device to retrieve and observed profile of the second computing device, as indicated by block 28. In some embodiments, the observed profile may include a variety of different types of attributes of the second computing device, collectively forming a "fingerprint" of the device that is expected to be relatively difficult to impersonate. Examples of attributes include those listed below.

In some embodiments, the (observed or known) profile includes the attributes of physical hardware of the second computing device, such as at least two, three, four, or each of the following: screen size; processor model; processor cache size; processor speed; memory size; device manufacturer; part numer, radio type; camera attributes; or inertial measurement unit attributes.

In some embodiments, the (observed or known) profile includes the attributes of software installed on the second computing device, such as at least two, three, four, or each of the following: an installed application; a version of an installed application; configuration of an installed application; permissions settings for an installed transaction; storage file paths of an installed applications; operating system; operating system version; or configuration of an operating system.

In some embodiments, the (observed or known) profile includes the attributes of firmware installed on the second computing device, such as at least two, three, four, or each of the following: firmware installed; a version of installed firmware; a register setting of installed firmware; an installation date of installed firmware; or a configuration of installed firmware.

In some embodiments, the (observed or known) profile includes usage attributes of the second computing device, such as at least two, three, four, or each of the following: a cellular carrier; a wireless access point secure set identifier stored in memory; a beacon identifier received wirelessly by the second computing device; a current geolocation of the second computing device sensed by a geolocation sensor of the second computing device; a past geolocation of the second computing device sensed by a geolocation sensor of the second computing device and stored in memory of the second computing device; or a match between a public Internet Protocol address of the first computing device and the second computing device. In some cases, the usage attributes include user behavior patterns around the mobile device. Examples include an interaction pattern (e.g., sequence of inputs repeated with greater than a threshold frequency or consistency) with a mobile or desktop application during an authentication workflow (e.g., a pattern of clicks, button pushes, or keystroke rhythm). In some cases, the interaction pattern includes a sequence of inputs and durations of time between the inputs. In some cases, the interaction pattern includes statistical distributions of these attributes, e.g., an area of a touchscreen touched by the user within less than two or three standard deviations of a mean location, or a duration of time between touches that is within two or three standard deviations of a mean duration of time.

In some embodiments, the observe profile is formed in advance of receiving the instructions that are sent in block 28 by the second computing device, or in some cases, the observe profile is formed in response to receiving the instructions by the second computing device. In some cases, an agent executing on the second computing device described below may form the observe profile by querying an operating system of the second computing device for the above-described attributes. In some cases, the number of attributes may be relatively large and relatively diverse, for instance, with more than 10, more than 50, or more than 200 different attributes. In some embodiments, the query results from querying the operating system may be stored in a serialized hierarchical data format like extensible markup language (XML) or JavaScript™ object notation (JSON), with keys indicating names of the attributes and values indicating the state of the attribute, for instance, "operating system version": "7.23.58." In some embodiments, the agent may return the observe profile to the computing system that sent the instructions or some other computing system. In some embodiments, the observe profile may be encrypted before transmission and decrypted upon receipt.

Next, some embodiments may receive the observed profile from the second computing device, as indicated by block 30. In some cases, this includes decrypting and loading a serialized data format into program state. In some embodiments, the instructions sent to the second computing device include a session identifier, such as a relatively long string that is formed randomly and is relatively difficult to guess, and the observe profile may be sent back with that string. Embodiments may compare the sent string to the received string to confirm that the observe profile is received from the computing device to which the instructions were sent.

Next, some embodiments may access a known profile of the second computing device, as indicated in block 32. For instance, some embodiments may query records in a user profile of the user for records pertaining to the second device including the known profile. In some embodiments, the known profile may include any of the above-described attributes in the observed profile. In some embodiments, the known prior profile includes a superset or a subset of those attributes. The known profile may be formed in advance of receiving an authentication request in block 12, for instance, several days or months in advance, during a registration process by which the user's profile is modified to include information about the second computing device. In some embodiments, the agent noted above and described below, during this registration process, may execute a query similar to those described above and communicate a known profile.

In some embodiments, the known profile may evolve over time, for instance, as operating systems are updated, programs are installed, firmware is updated or reconfigured, and usage patterns change. Accordingly, in some cases, known profiles may include timestamped attributes indicative of when the attribute was observed previously, statistical distributions (or characteristic parameters thereof, like a mean and standard deviation) of given attributes over time, or the like.

Next, some embodiments may determine whether the known profile corresponds to the observed profile, as indicated by block 34. This determination may be performed with a variety of different techniques, depending upon trade-offs between ease-of-use and security. Some embodiments may determine whether every attribute in the known profile that is most recent exactly matches every attribute in the observe profile, favoring security over ease-of-use to some extent. Some embodiments may determine whether more than a threshold amount (e.g., number, frequency, or percentage) of attributes match exactly between the known and observe profiles.

In some cases, certain attributes are expected to be more indicative of attacks than others, as some attributes are expected to change relatively frequently and are less indicative of the second computing device being impersonated. Accordingly, some embodiments may determine a score for each pair of attributes compared between the known profile and the observe profile and that score may be weighted based on the likelihood of differences indicating an attack. In some cases, the score is a binary value of zero or one indicating whether to values match exactly, like a device maker name, or a binary value of zero or one indicating whether a given operating system version has decremented or incremented between capturing the known profile and the observed profile. In some cases, the score is a cardinal value indicating differences between known and observed attributes, like a number of increments between application versions, or an edit distance between strings.

In some cases, the scores may be combined in a weighted combination, such as a weighted sum, by multiplying each score by a corresponding weight and summing the weighted values to determine an aggregate correspondence score. The weights may be determined with a variety of different techniques. In some cases, the weights may be hand tuned manually, for instance, by a system administrator or developer. In some cases, the weights may be changed dynamically based on feedback, such as feedback indicative of false positives or false negatives in the determination of block 34. In some cases, weights may be changed dynamically based on such feedback periodically, for instance, nightly or weekly, in advance of receiving the authentication request in block 12 (like more than an hour in advance). In some cases, the feedback may be based on records indicative of false positives and false negatives across an entire user base or a subset thereof, such as users associated with the same employer having an account with the system providing authentication. False positive records may be obtained by penetration testing exercises or helpdesk reports indicative of false positives. False negative records may be obtained through helpdesk reports, and in some cases, an agent executing on the second computing device may provide an input by which the user may report what they believe to be a false negative, producing a signal which may be logged, investigated, categorized, and used for training.

In some embodiments, weights may be trained with a supervised machine learning model, using this feedback as a training set. In some cases, a subset of the training set may be withheld for cross validation. In some cases, the training set may be subdivided for multiple instances of training (e.g., with randomized initial weights), and the results of the training instances may be compared and, for example, averaged, with bootstrap aggregation. In some embodiments, the model may be trained by executing a gradient descent that attempts to minimize an error function indicative of false positives and false negatives (which also encompasses a fitness function being maximized). In some cases, the training set includes a plurality of logged authentication sessions, each including the known profile, the observed profile, and a value indicating whether the determination of block 34 was correct. Some embodiments may tune the weights, for instance, with the gradient descent algorithm in an incremental process, such that increasing amounts of the inputs available from previous determinations result in correct determinations when the current weights are applied. For example, some embodiments may iteratively, until a termination condition occurs (like a threshold amount of iterations, or less than a threshold change in an error function result between iterations), determine partial derivatives of the weights relative to the error function, adjust the weights in a direction that the partial derivatives indicate will reduce the error function, and then repeat.

Some embodiments may perform the determination of block 34 with a rules engine. For example, some embodiments may include a plurality of rules that make determinations based on correspondence between various attributes in the known and observed profiles. Examples include a rule that determines the absence of correspondence in response to determining that an operating system version is lower in the observed profile than in the known profile. In some cases, the rules may be arranged hierarchically, for instance, with a rule that specifies the absence of correspondence in response to failing to determine correspondence in more than five of seven rules that pertain to particular respective attributes. In some cases, rules are evaluated conditionally upon other rules reaching a particular result, such as a rule that specifies an amount of central processing unit (CPU) cache (e.g., L2 or L3 cache) is to be matched exactly upon another rule indicating that the CPU manufacture name has greater than a threshold edit distance difference between the known and observe profiles in order to determine correspondence. In some cases, the number of rules may be relatively large, for instance, exceeding 10, and in many expected commercially relevant use cases exceeding 50. In some cases, some of the rules express necessary, but not sufficient conditions for determining that a known profile corresponds to an observed profile, and in some cases, some of the rules may express necessary and sufficient conditions.

Upon determining that the known profile does not correspond to the observed profile, some embodiments may log the session for purposes of subsequent model training, and send a message indicating that the second computing device is untrusted, as indicated by block 35. In some cases, the message may be sent to an agent executing on the second computing device via network, and the agent may present a user interface by which the user may input an indication that they believe the determination is incorrect, which may be routed to a helpdesk. In some cases, the message may be sent to another computing device, such as to a server hosting an application to which the user is attempting to secure access with the authentication request of block 12. In some cases, the message may be sent to the first computing device, with a user input by which the user may indicate that they believe the determination is incorrect.

Alternatively, upon determining that the known profile corresponds to the observed profile of block 34, some embodiments may proceed to block 36 and send a second authentication credential to the second computing device. In some cases, the second authentication credential may be sent via the same network to the same network address as the instructions were sent block 28, or in some cases, the network addresses may be different, for instance, using a telephone number for one transmission and an Internet protocol address for another. In some cases, the second authentication credential may be a text code sent via SMS or other type of push notification to the second computing device, such as a random string of between four and twelve characters. In some cases, the second authentication credential may be sent with instructions to display a message that the second authentication credential is to be entered into a user interface of the first computing device (thereby indicating that the person with access to the user interface of the first computing device is in possession of the second computing device and is less likely to be an attacker merely in possession of the user's password but not their mobile device).

Next, some embodiments may receive the second authentication credential from the first computing device, as indicated by block 38. In some cases, instructions may be sent to the first computing device to present user interface by which the authentication credential sent to the second computing devices to be entered. In some cases, this user interface includes a text input box, into which the user types the second authentication credential, and an associated submit input, by which the user instructs the first computing device to submit the entered authentication credential.

In other cases, the second authentication credential may be transmitted wirelessly between the first computing device and the second computing device, for instance, with a personal area network (like Bluetooth™ or near-field communication (NFC), a local area network (like a private wireless area network to which both the first and second computing device are connected), via an audio transmission by a speaker of the second computing device received by a microphone of the first computing device, or via an optical transmission (such as a QR code displayed on a screen of the second computing device and imaged by a camera of the first computing device).

Next, some embodiments may determine whether the second authentication credential is correct, as indicated by block 40. Some embodiments may maintain in memory a session record that associates the second authentication credential with the received authentication request of block 12 and with the received second authentication credential of block 38. Some embodiments may access the session record upon receiving the second authentication credential, for instance, in a network transmission also including a session identifier sent to the first computing device with the user interface by which the second authentication credential is entered, along with instructions to send the session identifier along with a submitted second authentication credential. Based on this session record, or other techniques, some embodiments may determine whether the received second authentication credential matches, for instance exactly, the sent second authentication credential.

Thus, some embodiments may confirm both that the second computing device is the same computing device as was associated with the user during registration and that the user attempting to login with the first computing device is in possession of the second computing device. This second factor of authentication is expected to be more difficult to attack by adversaries, for instance those attempting brute force attacks based solely on a password, or those capable of guessing a password based on known information about the user.

Upon determining that the second authentication credential is correct, some embodiments may send a message indicating that the user is authenticated, as discussed above with reference to block 24. Alternatively, upon determining that the second authentication credential is not correct, some embodiments may send a message indicating that the user is not authenticated, as indicated by block 18. The above-describe techniques for rate limiting failed authentication attempts may also be applied at the stage.

In some embodiments, the second authentication credential may be sent to the first computing device and entered into the second computing device, rather than vice versa. In this scenario, the second computing device's observed profile may still be matched to the known profile to determine that the second credential is received from a trusted, non-emulated device.

In some embodiments, the second authentication credential may be sent without regard to whether the known profile corresponds to the observed profile (which is not to suggest that other features are not also amenable to variation). For instance, the second credential may be sent when the profiles do not correspond, but the received instance of the second credential may still be disregarded in response to the lack of correspondence.

Figure 2:
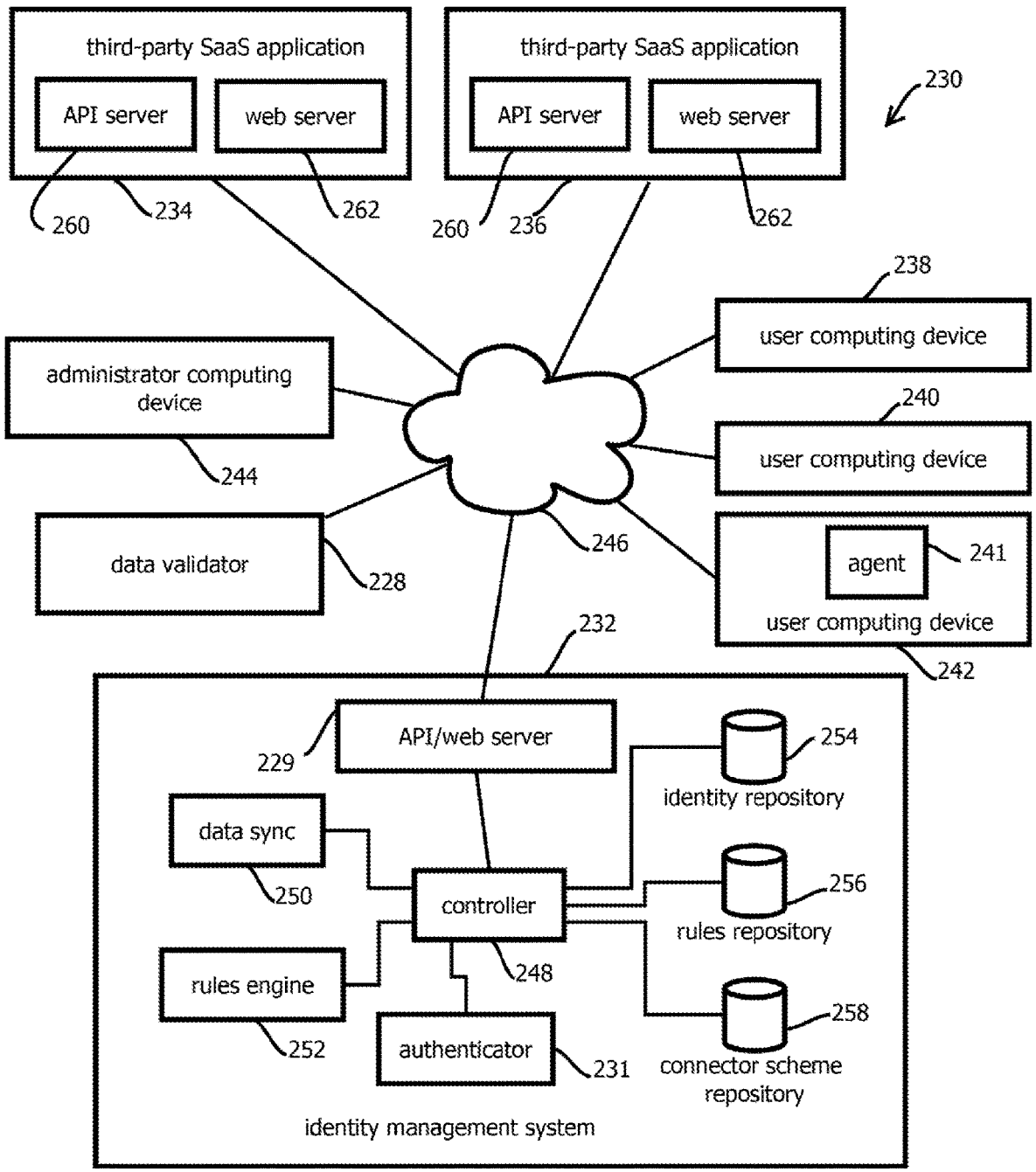
FIG. 2 illustrates a computing environment having an identity management system that may implement the process of FIG. 1 in accordance with some embodiments.

FIG. 2 is a block diagram of a computing environment 230 in which the above-describe techniques may be implemented, though it should be emphasized that this is one example of a variety of different systems that are expected benefit from the presently described techniques.

As enterprises move their applications to the cloud, and in particular to SaaS applications provided by third parties, it can become very burdensome and complex to manage roles and permissions of employees. For example, a given business may have 20 different subscriptions to 20 different SaaS offerings (like web-based email, customer resource management systems, enterprise resource planning systems, document management systems, and the like). And that business may have 50,000 employees with varying responsibilities in the organization, with employees coming and going and changing roles regularly. Generally, the business would seek to tightly control which employees can access which SaaS services, and often which features of those services each employee can access. For instance, a manager may have permission to add or delete a defect-tracking ticket, while a lower-level employee may only be allowed to add notes or advance state of the ticket in a workflow. Or certain employees may have elevated access to certain email accounts or sensitive human resources related documents. Each time an employee arrives, leaves, or changes roles, different sets of SaaS user accounts may need to be added, deleted, or updated. Thus, many businesses are facing a crisis of complexity, as they attempt to manage roles in permissions across a relatively large organization using a relatively large number of SaaS services with relatively fine-grained feature-access controls.

These issues may be mitigated by some embodiments of the computing environment 230, which includes an identity management system 232 that manages roles and permissions on a plurality of different third-party SaaS applications 234 and 236. In some cases, the SaaS applications may be accessed by users having accounts and various roles, subject to various permissions, on user computing devices 238, 240, or 242, and those accounts may be managed by an administrator operating administrator computing device 244. In some cases, the user computing devices and administrator computing device may be computing devices operated by a single entity, such as a single entity within a single local area network or domain. Or in some cases, the user computing devices 238, 240, and 242 may be distributed among a plurality of different local area networks, for instance, within an organization having multiple networks. In the figure, the number of third-party application servers and user computing devices is two and three respectively, but it should be appreciated that commercial use cases are expected to involve substantially more instances of such devices. Expected use cases involve more than 10 third-party SaaS applications, and in many cases more than 20 or 50 third-party SaaS applications or on-premises applications. Similarly, expected use cases involve more than 1,000 user computing devices, and in many cases more than 10,000 or more than 50,000 user computing devices. In some cases, the number of users is expected to scale similarly, in some cases, with users transitioning into new roles at a rate exceeding 10 per day, and in many commercially relevant use cases, exceeding 100 or 1,000 per day on average. Similarly, versioning of third-party APIs and addition or subtraction of third-party APIs is expected to result in new APIs or new versions of APIs being added monthly or more often in some use cases.

In some embodiments, the user computing devices 238, 240, and 242 may be operated by users accessing or seeking access to the third-party SaaS applications, and administrator computing device 244 may be operated by a system administrator that manages that access. In some embodiments, such management may be facilitated with the identity management system 232, which in some cases, may automatically create, delete, or modify user accounts on various subsets or all of the third-party SaaS applications in response to users being added to, removed from, or moved between, roles in an organization. In some embodiments, each role may be mapped to a plurality of account configurations for the third-party SaaS applications. In some embodiments, in response to a user changing roles, the administrator may indicate that change in roles via the administrator computing device 244, in a transmission to the identity management system 232.

In response to this transmission, the identity management system may retrieve from memory and updated set of account configurations for the user in the new role, and records of these new account configurations may be created in a graph database in the identity management system 232. That graph database and the corresponding records may be synchronized with corresponding third-party applications 234 and 236 to implement the new account configurations. Further, in some cases, a new deployment of the identity management system 232 may contain a graph database populated initially by extracting data from the third-party SaaS applications and translating that data into a canonical format suitable for the graph database. In some embodiments, the third-party SaaS applications may include an API server 260 and a web server 262.

In some embodiments, the computing environment 230 includes a data validator 228 that validates data according to diverse data schemas. In some cases, the data validator includes a document database storing diverse schemas, a schema formation module that performs a process form schemas, including a schema crawler configured to recursively crawl through a set of linked schemas, and modules that combine criteria from the schemas. In some cases, the data validator 228 may validate data entering the identity repository 254 of the identity management system 232.

In some embodiments, the identity management system 232 may include a web/API server 229. In some embodiments, the server 229 may receiving in-bound or out-bound data, identify a corresponding document specifying how to translate between API formats (or constitute the document via references expressing inheritance and polymorphism), and perform a process to translate data between external data schemas and an internal data schema of the identity repository 254.

In some embodiments, each of the third-party SaaS applications are at different domains, having different subnetworks, at different geographic locations, and are operated by different entities. In some embodiments, a single entity may operate multiple third-party SaaS applications, for instance, at a shared data center, or in some cases, a different third-party may host the third-party SaaS applications on behalf of multiple other third parties. In some embodiments, the third-party SaaS applications may be geographically and logically remote from the identity management system 232 and each of the computing devices 238, 240, 242, and 244. In some embodiments, these components 232 through 242 may communicate with one another via various networks, including the Internet 246 and various local area networks.

In some embodiments, the identity management system 232 includes a controller 248, an authenticator 231, a data synchronization module 250, a rules engine 252, and identity repository 254, a rules repository 256, and a connector schema repository 258. In some embodiments, the controller 248 may direct the operations described above, in some cases by communicating with the various other modules of the identity management system and the other components of the computing environment 230. In some embodiments, the data synchronization module 250 may be configured to synchronize records in the identity repository 254 with records in the third-party SaaS applications, for instance by translating those records at the direction of the controller 248. For instance, a user may transfer into a sales group at a company, and the rules may indicate that in the new role, the user is be given a SaaS customer-relationship management account, and that account is to be added in the SaaS application to a group corresponding to a geographic sales region. These may lead to sequential tasks, where the account needs to be created via the API, before the API can be commanded to add the account to a group.

In some embodiments, the identity management system 232 may include an authenticator 231 configured to execute the routine described above with reference to FIG. 1. In some cases, the user computing device 240 may serve as the first computing device, and the user computing device 242 may serve as the second user computing device in the routine above. In some embodiments, the second user computing device may have installed thereon an agent application 241, such as an application that executes as a background process and is configured to perform the operations described above by which the sent instructions to the second computing device to retrieve the observe profile are received, executed, and a observe profile is returned. In some cases, the agent 241 may execute as a background process of an application installed during registration of the user, before the authentication of block 12 described above begins.

In some embodiments, the rules engine 252 may be configured to update the identity repository 254 based on rules in the rules repository 256 to determine third-party SaaS application account configurations based on changes in roles of users, for instance received from the administrator computing device 244, at the direction of controller 248. In some embodiments, the administrator computing device 244 may send a command to transition a user from a first role to a second role, for instance, a command indicating the user has moved from a first-level technical support position to a management position. In response, the controller 248 may retrieve a set of rules (which may also be referred to as a "policy") corresponding to the former position and a set of rules corresponding to the new position from the rules repository 246. In some embodiments, these sets of rules may indicate which SaaS applications should have accounts for the corresponding user/role and configurations of those accounts, like permissions and features to enable or disable. In some embodiments, these rules may be sent to the rules engine 252, which may compare the rules to determine differences from a current state, for instance, configurations to change or accounts to add or remove. In some embodiments, the rules engine 252 may update records in the identity repository 254 to indicate those changes, for instance, removing accounts, changing groups to which users belong, changing permissions, adding accounts, removing users from groups, and the like. In some cases, applying the rules may be an example of unordered tasks performed by the system. In some embodiments, these updates may be updates to a graph data structure. In some embodiments, the graph data structure may be a neo4j graph database available from Neo Technology, Inc. of San Mateo, Calif. In some embodiments, the controller 248 may respond to these updates by instructing the data sync module 252 translate the modified nodes and edges into API commands and sending those API commands to the corresponding third-party SaaS applications.

In some embodiments, the identity repository 254 may include a graph data structure indicating various entities and relationships between those entities that describe user accounts, user roles within an organization, and the third-party SaaS applications. For instance, some embodiments may record as entities in the graph data structure the third-party SaaS applications, accounts of those applications, groups of user accounts (in some cases in a hierarchical taxonomy), groups of users in an organization (again, in some cases in a hierarchical taxonomy, like an organizational structure), user accounts, and users. Each of these nodes may have a variety of attributes, e.g., user names for user accounts, user identifiers for users, group names, and group leaders for groups, and the like. In some embodiments, the graph data structure may be a neo4j graph database available from Neo Technology, Inc. of San Mateo, Calif.

In some embodiments, these nodes may be related to one another through various relationships that may be encoded as edges of the graph. For instance, an edge may indicate that a user is a member of a subgroup, and that that subgroup is a member of a group of subgroups. Similarly, and edge may indicate that a user has an account, and that the account is a member of a group of accounts, like a distribution list. In some examples, and edge may indicate that an account is with a SaaS application, with the respective edge linking between a node corresponding to the particular account and another node corresponding to the SaaS application. In some embodiments, multiple SaaS applications may be linked by edges to a node corresponding to a given party, such as a third-party.

In some embodiments, this data structure is expected to afford relatively fast operation by computing systems for certain operations expected to be performed relatively frequently by the identity management system 232. For instance, some embodiments may be configured to relatively quickly query all accounts of the user by requesting all edges of the type "has_an_account" connected to the node corresponding to the user, with those edges identifying the nodes corresponding to the respective accounts. In another example, all members of a group may be retrieved relatively quickly by requesting all nodes connected to a node correspond to the group by an edge that indicates membership. Thus, the graph data structure may afford relatively fast operation compared to many traditional systems based on relational databases in which such relationships are evaluated by cumbersome join operations extending across several tables or by maintaining redundant indexes that slow updates. (Though, embodiments are also consistent with use of relational databases instead of graph databases, as multiple, independently useful techniques are described).

Figure 3:
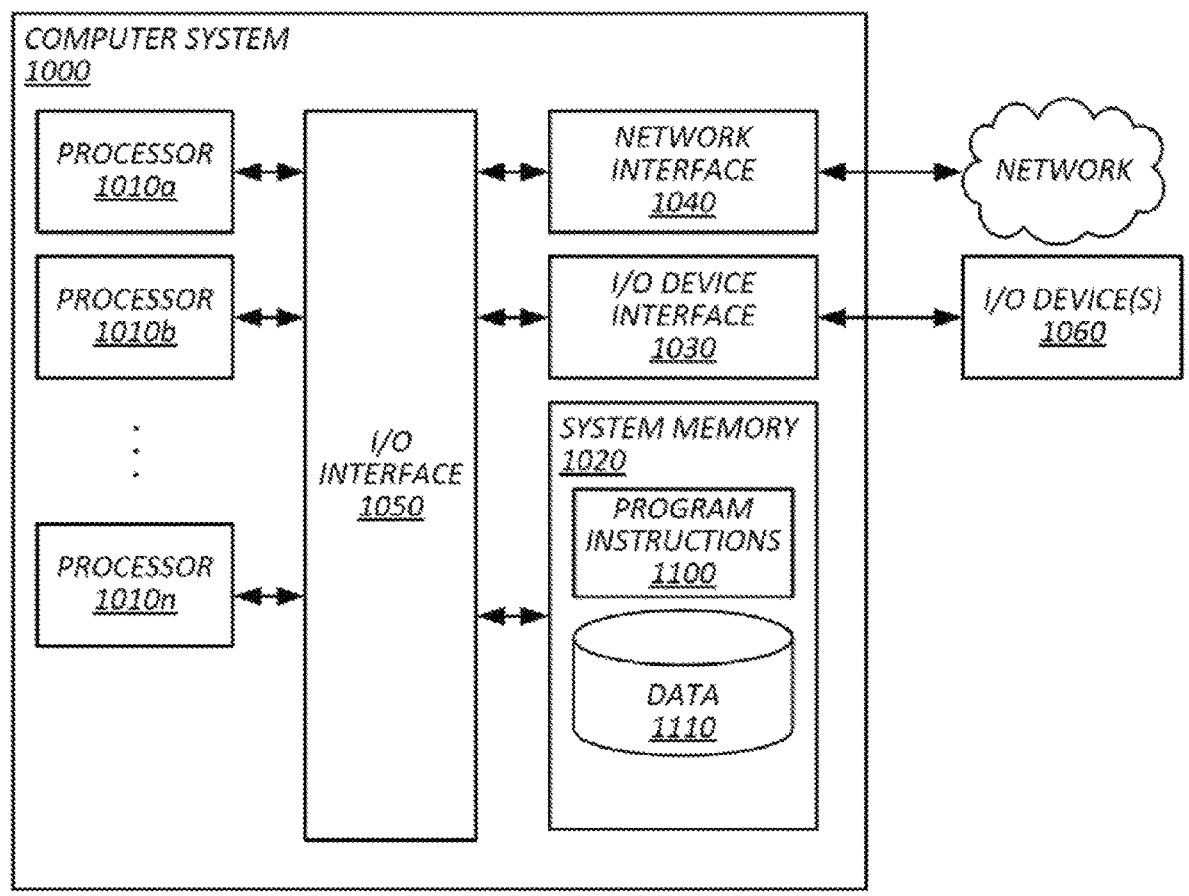
FIG. 3 illustrates an example of a computing system by which the above systems and processes may be implemented.

FIG. 3 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several techniques. Rather than separating those techniques into multiple isolated patent applications, the inventors have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the disclosed techniques to the particular form disclosed, but to the contrary, the intention is to cover all modifications, equivalents, and alternatives falling within the spirit and scope of the present disclosed techniques as defined by the appended claims. Further modifications and alternative embodiments of various aspects of the disclosed techniques will be apparent to those skilled in the art in view of this description. Accordingly, this description and the drawings are to be construed as illustrative only and are for the purpose of teaching those skilled in the art the general manner of carrying out the disclosed techniques. Elements and materials may be substituted for those illustrated and described herein, parts and processes may be reversed or omitted, and certain features of the disclosed techniques may be utilized independently, all as would be apparent to one skilled in the art after having the benefit of this description. Changes may be made in the elements described herein without departing from the spirit and scope of the disclosed techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

The present techniques will be better understood with reference to the following enumerated clauses:

1. A method of authenticating a user, the method comprising: receiving, with one or more processors, via a network, an authentication request sent by a first computing device associated with a user to be authenticated; determining, with one or more processors, a second computing device, different from the first computing device, associated with the user based on a record created before receiving the authentication request; sending, with one or more processors, via a network, instructions to the second computing device that cause the second computing to effectuate operations comprising: forming with the second computing device, or accessing in storage of the second computing device, an observed profile of the second computing device, wherein the observed profile is based on attributes of the second computing device, the attributes including: attributes of physical hardware of the second computing device, attributes of software installed on the second computing device, attributes of firmware installed on the second computing device, or usage attributes of the second computing device, and sending, via a network, the observed profile in response to receiving the instructions; receiving, with one or more processors, via a network, the observed profile; accessing, with one or more processors, a known profile of the second computing device formed, at least in part, before receiving the authentication request, wherein the known profile is based on the attributes of the second computing device; determining, with one or more processors, that the known profile corresponds to the observed profile based on correspondence between known and observed attributes of the second computing device; in response to the determination that the known profile corresponds to the observed profile, sending, with one or more processors, an authentication credential to the second computing device; receiving, with one or more processors, the authentication credential from the first computing device after sending the authentication credential to the second computing device; in response to receiving the authentication credential from the first computing device, determining, with one or more processors, that the user is authenticated; and sending, with one or more processors, via a network, a message indicating that the user is authenticated or granting access to resources in response to determining that the user is authenticated.

2. The method of embodiment 1, wherein the observed profile includes the attributes of physical hardware, the attributes of physical hardware including at least two of the following: screen size; processor model; processor cache size; processor speed; memory size; device manufacturer; radio type; camera attributes; or inertial measurement unit attributes.

3. The method of any one of embodiments 1-2, wherein the observed profile includes the attributes of software installed on the second computing device, the attributes of software including at least two of the following: an installed application; a version of an installed application; configuration of an installed application; permissions settings for an installed transaction; storage file paths of an installed applications; operating system; operating system version; or configuration of an operating system.

4. The method of any one of embodiments 1-3, wherein the observed profile includes the attributes of firmware installed on the second computing device, the attributes of firmware including at least two of the following: firmware installed; a version of installed firmware; a register setting of installed firmware; an installation date of installed firmware; or a configuration of installed firmware.

5. The method of any one of embodiments 1-4, wherein observed profile includes the usage attributes, the usage attributes including at least two of the following: a cellular carrier; a wireless access point secure set identifier stored in memory; a beacon identifier received wirelessly by the second computing device; a current geolocation of the second computing device sensed by a geolocation sensor of the second computing device; a past geolocation of the second computing device sensed by a geolocation sensor of the second computing device and stored in memory of the second computing device; or a match between a public Internet Protocol address of the first computing device and the second computing device.

6. The method of any one of embodiments 1-5, wherein determining that the known profile corresponds to the observed profile comprises: determining a score based on both: whether each of a plurality of attributes of the second computing device match between the known profile and the observed profile, and a plurality of weightings associated with respective attributes; and determining whether that the score satisfies a threshold.

7. The method of embodiment 6, wherein: the weights or the threshold are adjusted dynamically based on feedback indicative of false positives or false negatives in authentication determinations.

8. The method of embodiment 6, wherein: the weights are determined by training a supervised learning model on a training set with false positives and false negatives in real or simulated authentication determinations.

9. The method of any one of embodiments 1-8, wherein determining that the known profile corresponds to the observed profile comprises: obtaining a plurality of rules, wherein: the rules are each based on one or more attributes of both the known profile and the observed profile, and at least some of the rules express necessary but not sufficient conditions for determining that the known profile corresponds to the observed profile; evaluating the rules with a rules engine to produce a plurality of evaluating results; and determining that the known profile corresponds to the observed profile based on the plurality of evaluation results.

10. The method of embodiment 9, wherein some of the rules are applied by the rules engine in response to evaluation results of a first rule, and wherein other rules are not applied by the rules engine in response to evaluation results of a second rule among the plurality of rules.

11. The method of any one of embodiments 1-10, comprising: receiving another authentication credential from the first computing device, wherein determining that the user is authenticated is based on both received authentication credentials.

12. The method of any one of embodiments 1-11, wherein determining that the known profile corresponds to the observed profile comprises steps for determining that a known profile corresponds to an observed profile.

13. The method of any one of embodiments 1-12, comprising: determining that the observed profile is different from the known profile and, in response, updating the known profile to more closely match the observed profile.

14. The method of any one of embodiments 1-13, wherein: determining that the known profile corresponds to the observed profile comprises determining that the known profile partially corresponds to the observed profile; and the message indicating that the user is authenticated is sent and indicates that the user is authenticated to access fewer resources than if the known profile more fully corresponded to the observed profile.

15. The method of any one of embodiments 1-14, wherein: both the observed profile and the known profile include at least twelve of the following: screen size; processor model; processor cache size; processor speed; memory size; device manufacturer; radio type; camera attributes; inertial measurement unit attributes; an installed application; a version of an installed application; configuration of an installed application; permissions settings for an installed transaction; storage file paths of an installed applications; operating system; operating system version; configuration of an operating system; firmware installed; a version of installed firmware; a register setting of installed firmware; an installation date of installed firmware; a configuration of installed firmware; a cellular carrier; a wireless access point secure set identifier stored in memory; a beacon identifier received wirelessly by the second computing device; a current geolocation of the second computing device sensed by a geolocation sensor of the second computing device; a past geolocation of the second computing device sensed by a geolocation sensor of the second computing device and stored in memory of the second computing device; or a match between a public Internet Protocol address of the first computing device and the second computing device; the observed profile is formed by the second computing device in response to the instructions being received in a push notification by an application executing on the second computing device as a background process; determining that the user is authenticated is based on a two-factor authentication protocol including as one of the two factors the authentication credential sent to the second computing device; the second computing device is a mobile computing device previously registered by the user as being associated with a user account of the user, the user account including a user identifier submitted with the authentication request or retrieved after receiving the authentication request; the first computing device executes a web browser that causes the authentication request to be sent; and determining that the known profile corresponds to the observed profile comprises determining that more than a threshold amount of attributes match, wherein the threshold is determined based on a risk score associated with the authentication request, the risk score being determined based on a profile of the user including data about previous computing sessions.

16. The method of any one of embodiments 1-15, comprising: providing access to an application in response to the message indicating that the user is authenticated; and providing services to the user via the first computing device with the application.

17. A tangible, non-transitory, machine-readable medium storing instructions that when executed by a data processing apparatus cause the data processing apparatus to effectuate operations comprising: the operations of any of embodiments 1-16.

18. A system, comprising: one or more processors; and memory storing instructions that when executed by at least some of the processors effectuate operations comprising: the operations of any of embodiments 1-16.

What is claimed is:

1. A tangible, non-transitory, machine-readable medium storing instructions that, when executed by one or more processors, effectuate operations comprising:
    receiving, with one or more processors, via a network, an authentication request sent by a first computing device associated with and in possession of a user to be authenticated;
    determining, with one or more processors, a second computing device, different from the first computing device, associated with and in possession of the user based on a record created before receiving the authentication request;
    sending, with one or more processors, via a network, instructions to the second computing device that cause the second computing device to effectuate operations comprising:
        forming with the second computing device, or accessing in storage of the second computing device, an observed profile of the second computing device, wherein the observed profile is based on attributes of the second computing device, the attributes including:
            attributes of physical hardware of the second computing device,
            attributes of software installed on the second computing device,
            attributes of firmware installed on the second computing device, or
            usage attributes of the second computing device, and
        sending, via a network, the observed profile in response to receiving the instructions;
    receiving, with one or more processors, via a network, the observed profile;
    accessing, with one or more processors, a known profile of the second computing device formed, at least in part, before receiving the authentication request, wherein the known profile is based on the attributes of the second computing device;

determining, with one or more processors, that the known profile corresponds to the observed profile based on correspondence between known and observed attributes of the second computing device;
sending, with one or more processors, an authentication credential to either the second computing device or the first computing device;
after sending the authentication credential, receiving, with one or more processors, the authentication credential from either the first computing device or the second computing device, wherein the authentication credential is received from a different computing device from the computing device to which the authentication credential was sent;
in response to receiving the authentication credential and the determination that the known profile corresponds to the observed profile, determining, with one or more processors, that the user is authenticated; and
sending, with one or more processors, via a network, a message indicating that the user is authenticated or granting access to resources in response to determining that the user is authenticated.

2. The medium of claim 1, wherein the observed profile includes the attributes of physical hardware, the attributes of physical hardware including at least two of the following:
screen size;
processor model;
processor cache size;
processor speed;
memory size;
device manufacturer;
radio type;
camera attributes; or
inertial measurement unit attributes.

3. The medium of claim 1, wherein the observed profile includes the attributes of software installed on the second computing device, the attributes of software including at least two of the following:
an installed application;
a version of an installed application;
configuration of an installed application;
permissions settings for an installed transaction;
storage file paths of an installed applications;
operating system;
operating system version; or
configuration of an operating system.

4. The medium of claim 1, wherein the observed profile includes the attributes of firmware installed on the second computing device, the attributes of firmware including at least two of the following:
firmware installed;
a version of installed firmware;
a register setting of installed firmware;
an installation date of installed firmware; or
a configuration of installed firmware.

5. The medium of claim 1, wherein observed profile includes the usage attributes, the usage attributes including at least two of the following:
a cellular carrier;
a wireless access point secure set identifier stored in memory;
a beacon identifier received wirelessly by the second computing device;
a current geolocation of the second computing device sensed by a geolocation sensor of the second computing device;
a past geolocation of the second computing device sensed by a geolocation sensor of the second computing device and stored in memory of the second computing device; or
a match between a public Internet Protocol address of the first computing device and the second computing device.

6. The medium of claim 1, wherein determining that the known profile corresponds to the observed profile comprises:
determining a score based on both:
whether each of a plurality of attributes of the second computing device match between the known profile and the observed profile, and
a plurality of weightings associated with respective attributes; and
determining whether that the score satisfies a threshold.

7. The medium of claim 6, wherein:
the weights or the threshold are adjusted dynamically based on feedback indicative of false positives or false negatives in authentication determinations.

8. The medium of claim 6, wherein:
the weights are determined by training a supervised learning model on a training set with false positives and false negatives in real or simulated authentication determinations.

9. The medium of claim 1, wherein determining that the known profile corresponds to the observed profile comprises:
obtaining a plurality of rules, wherein:
the rules are each based on one or more attributes of both the known profile and the observed profile, and
at least some of the rules express necessary but not sufficient conditions for determining that the known profile corresponds to the observed profile;
evaluating the rules with a rules engine to produce a plurality of evaluating results; and
determining that the known profile corresponds to the observed profile based on the plurality of evaluation results.

10. The medium of claim 9, wherein:
some of the rules are applied by the rules engine in response to evaluation results of a first rule, and wherein other rules are not applied by the rules engine in response to evaluation results of a second rule among the plurality of rules.

11. The medium of claim 1, the operations further comprising:
receiving another authentication credential from the first computing device, wherein determining that the user is authenticated is based on both received authentication credentials.

12. The medium of claim 1, wherein determining that the known profile corresponds to the observed profile comprises steps for determining that a known profile corresponds to an observed profile.

13. The medium of claim 1, the operations comprising:
determining that the observed profile is different from the known profile and, in response, updating the known profile to more closely match the observed profile.

14. The medium of claim 1, wherein:
determining that the known profile corresponds to the observed profile comprises determining that the known profile partially corresponds to the observed profile; and
the message indicating that the user is authenticated is sent and indicates that the user is authenticated to access fewer resources than if the known profile more fully corresponded to the observed profile.

15. The medium of claim 1, wherein:
both the observed profile and the known profile include at least twelve of the following:
screen size;
processor model;
processor cache size;
processor speed;
memory size;
device manufacturer;
radio type;
camera attributes;
inertial measurement unit attributes;
an installed application;
a version of an installed application;
configuration of an installed application;
permissions settings for an installed transaction;
storage file paths of an installed applications;
operating system;
operating system version;
configuration of an operating system;
firmware installed;
a version of installed firmware;
a register setting of installed firmware;
an installation date of installed firmware;
a configuration of installed firmware;
a cellular carrier;
a wireless access point secure set identifier stored in memory;
a beacon identifier received wirelessly by the second computing device;
a current geolocation of the second computing device sensed by a geolocation sensor of the second computing device;
a past geolocation of the second computing device sensed by a geolocation sensor of the second computing device and stored in memory of the second computing device;
an interaction pattern; or
a match between a public Internet Protocol address of the first computing device and the second computing device;
the observed profile is formed by the second computing device in response to the instructions being received in a push notification by an application executing on the second computing device as a background process;
determining that the user is authenticated is based on a two-factor authentication protocol including as one of the two factors the authentication credential sent to the second computing device;
the authentication credential is sent to the second computing device in response to the determination that the known profile matches the observed profile;
the second computing device is a mobile computing device previously registered by the user as being associated with a user account of the user, the user account including a user identifier submitted with the authentication request or retrieved after receiving the authentication request;
the first computing device executes a web browser that causes the authentication request to be sent; and
determining that the known profile corresponds to the observed profile comprises determining that more than a threshold amount of attributes match, wherein the threshold is determined based on a risk score associated with the authentication request, the risk score being determined based on a profile of the user including data about previous computing sessions.

16. The medium of claim 1, the operations further comprising:
providing access to an application in response to the message indicating that the user is authenticated; and
providing services to the user via the first computing device with the application.

17. A method, comprising:
receiving, via a network, an authentication request sent by a first computing device associated with and in possession of a user to be authenticated;
determining a second computing device, different from the first computing device, associated with and in possession of the user based on a record created before receiving the authentication request;
sending, via a network, instructions to the second computing device that cause the second computing device to effectuate operations comprising:
forming with the second computing device, or accessing in storage of the second computing device, an observed profile of the second computing device, wherein the observed profile is based on attributes of the second computing device, the attributes including:
attributes of physical hardware of the second computing device,
attributes of software installed on the second computing device,
attributes of firmware installed on the second computing device, or
usage attributes of the second computing device, and
sending, via a network, the observed profile in response to receiving the instructions;
receiving, via a network, the observed profile;
accessing a known profile of the second computing device formed, at least in part, before receiving the authentication request, wherein the known profile is based on the attributes of the second computing device;
determining that the known profile corresponds to the observed profile based on correspondence between known and observed attributes of the second computing device;
sending an authentication credential to either the second computing device or the first computing device;
after sending the authentication credential, receiving the authentication credential from either the first computing device or the second computing device, wherein the authentication credential is received from a different computing device from the computing device to which the authentication credential was sent;
in response to receiving the authentication credential and the determination that the known profile corresponds to the observed profile, determining that the user is authenticated; and
sending, via a network, a message indicating that the user is authenticated or granting access to resources in response to determining that the user is authenticated.

18. The method of claim 17, wherein:
both the observed profile and the known profile include at least six of the following:
screen size;
processor model;
processor cache size;
processor speed;
memory size;
device manufacturer;

radio type;
camera attributes;
inertial measurement unit attributes;
an installed application;
a version of an installed application;
configuration of an installed application;
permissions settings for an installed transaction;
storage file paths of an installed applications;
operating system;
operating system version;
configuration of an operating system;
firmware installed;
a version of installed firmware;
a register setting of installed firmware;
an installation date of installed firmware;
a configuration of installed firmware;
a cellular carrier;
a wireless access point secure set identifier stored in memory;
a beacon identifier received wirelessly by the second computing device;
a current geolocation of the second computing device sensed by a geolocation sensor of the second computing device;
a past geolocation of the second computing device sensed by a geolocation sensor of the second computing device and stored in memory of the second computing device;
an interaction pattern; or
a match between a public Internet Protocol address of the first computing device and the second computing device.

19. The method of claim 17, wherein:
determining that the user is authenticated is based on a two-factor authentication protocol including as one of the two factors the authentication credential sent to the second computing device;
the authentication credential is sent to the second computing device in response to the determination that the known profile matches the observed profile;
the second computing device is a mobile computing device previously registered by the user as being associated with a user account of the user, the user account including a user identifier submitted with the authentication request or retrieved after receiving the authentication request; and
the first computing device executes a web browser that causes the authentication request to be sent.

20. The method of claim 17, wherein:
at least part of the observed profile is formed by the second computing device in response to the instructions being received in a push notification by an application executing on the second computing device as a background process;
determining that the user is authenticated is based on a two-factor authentication protocol including as one of the two factors the authentication credential sent to the second computing device;
the authentication credential is sent to the second computing device in response to the determination that the known profile matches the observed profile;
the second computing device is a mobile computing device previously registered by the user as being associated with a user account of the user, the user account including a user identifier submitted with the authentication request or retrieved after receiving the authentication request;
the first computing device executes a web browser that causes the authentication request to be sent; and
determining that the known profile corresponds to the observed profile comprises determining that more than a threshold amount of attributes match, wherein the threshold is determined based on a risk score associated with the authentication request, the risk score being determined based on a profile of the user including data about previous computing sessions.

* * * * *